United States Patent
Yang et al.

(10) Patent No.: US 11,379,423 B2
(45) Date of Patent: Jul. 5, 2022

(54) SELF-LEARNING FILE DELEGATION SYSTEM AND METHOD

(71) Applicant: EMC IP Holding Company, LLC, Hopkinton, MA (US)

(72) Inventors: Jianfei Yang, Sichuan (CN); Chaojun Zhao, Sichuan (CN); Xiaoyu Ren, Sichuan (CN); Changxu Jiang, Sichuan (CN); Srinivasa R. Chamarthy, Karnataka (IN)

( * ) Notice: Subject to any disclaimer, the term of this patent is extended or adjusted under 35 U.S.C. 154(b) by 103 days.

(21) Appl. No.: 16/402,806

(22) Filed: May 3, 2019

(65) Prior Publication Data

US 2020/0349119 A1 Nov. 5, 2020

(51) Int. Cl.
*G06F 16/176* (2019.01)
*G06N 20/00* (2019.01)
*G06F 16/17* (2019.01)

(52) U.S. Cl.
CPC ...... *G06F 16/1774* (2019.01); *G06F 16/1734* (2019.01); *G06N 20/00* (2019.01)

(58) Field of Classification Search
CPC .. G06F 16/1774; G06F 16/1734; G06N 20/00
USPC ........................................................ 707/704
See application file for complete search history.

(56) References Cited

U.S. PATENT DOCUMENTS

| | | | | |
|---|---|---|---|---|
| 8,433,694 B1* | 4/2013 | Eldridge | ............... | G06F 16/172 707/705 |
| 2007/0016583 A1* | 1/2007 | Lempel | ............... | G06F 21/6218 |
| 2008/0028164 A1* | 1/2008 | Ikemoto | .................. | G06F 3/067 711/154 |
| 2008/0147665 A1* | 6/2008 | Brjazovski | ................ | G06F 9/52 |
| 2011/0225199 A1* | 9/2011 | Marathe | ................ | G06Q 10/10 707/781 |
| 2012/0101995 A1* | 4/2012 | Agetsuma | ............. | G06F 16/185 707/644 |
| 2012/0143999 A1* | 6/2012 | George | ............... | G06F 12/0815 709/219 |
| 2013/0080377 A1* | 3/2013 | Newnham | ................ | G06N 5/02 706/52 |
| 2013/0138705 A1* | 5/2013 | Agetsuma | ............. | G06F 3/0683 707/822 |
| 2017/0286860 A1* | 10/2017 | Chen | ......................... | G06N 3/08 |
| 2018/0218080 A1* | 8/2018 | Krishnamurthy | ...... | G06N 3/006 |
| 2018/0373722 A1* | 12/2018 | Ulasen | ..................... | G06N 3/08 |
| 2019/0108239 A1* | 4/2019 | Yang | ..................... | G06F 40/166 |
| 2019/0179938 A1* | 6/2019 | Feuz | ....................... | G06F 9/542 |
| 2019/0327271 A1* | 10/2019 | Saxena | ................ | G06N 3/0454 |
| 2019/0364492 A1* | 11/2019 | Azizi | ................ | H04W 52/0264 |

\* cited by examiner

Primary Examiner — Hicham Skhoun

(57) ABSTRACT

A method, computer program product, and computing system for receiving a request from a client device to access a file stored in a storage system configured to be communicatively coupled to a plurality of client devices. It may be determined whether to delegate the file to the requesting client device based upon, at least in part, a reinforcement learning model, thus defining a file delegation determination. An access pattern associated with the file may be monitored. The reinforcement learning model may be updated based upon, at least in part, the monitored access pattern associated with the file and the file delegation determination.

17 Claims, 7 Drawing Sheets

500

Access pattern

600

700

| time_stamp | client_id | action |
|---|---|---|
| 2018-12-10-18-54-49 | 0 | write |
| 2018-12-10-18-57-22 | 0 | close |
| 2018-12-10-18-57-28 | 0 | write |
| 2018-12-10-18-58-04 | 0 | close |
| 2018-12-10-18-58-07 | 0 | write |
| 2018-12-10-18-59-58 | 0 | close |
| 2018-12-10-19-00-02 | 1 | read |
| 2018-12-10-19-00-04 | 0 | write |
| 2018-12-10-19-00-14 | 1 | close |
| 2018-12-10-19-01-13 | 0 | close |
| 2018-12-10-19-01-40 | 0 | write |
| ... | ... | ... |

FIG. 7

SELF-LEARNING FILE DELEGATION SYSTEM AND METHOD

BACKGROUND

Storing and safeguarding electronic content may be beneficial in modern business and elsewhere. Accordingly, various methodologies may be employed to protect and distribute such electronic content. Since Network File System version 4 (e.g., NFSv4), file delegation has been introduced to improve cache behavior. For example, once a file has been delegated to a client, the client can cache the file's data and metadata aggressively and handle opens, closes, and file locks to the file locally without immediate interaction with the server. Despite the advantages that the delegation may provide, there are still costs. For example, once a delegation is granted, there will be some overheads at the server side, like delegation conflict, delegation limits, and/or delegation file system size management.

SUMMARY OF DISCLOSURE

In one example implementation, a computer-implemented method executed on a computing device may include but is not limited to receiving a request from a client device to access a file stored in a storage system configured to be communicatively coupled to a plurality of client devices. It may be determined whether to delegate the file to the requesting client device based upon, at least in part, a reinforcement learning model, thus defining a file delegation determination. An access pattern associated with the file may be monitored. The reinforcement learning model may be updated based upon, at least in part, the monitored access pattern associated with the file and the file delegation determination.

One or more of the following example features may be included. Determining whether to delegate the file to the requesting client device may include determining if an access conflict exists for the file in the storage system. The requesting client device may be denied from receiving a delegation of the file in response to determining that the access conflict exists for the file in the storage system. It may be determined whether the client device is eligible for delegation of the file in response to that no access conflict exists for the file in the storage system. Determining whether to delegate the file to the requesting client device may include calculating a delegation possibility value based upon, at least in part, the reinforcement learning model; comparing the delegation possibility value to a predetermined delegation threshold; and delegating the file to the requesting client device if the delegation possibility value is greater than the predetermined delegation threshold. Updating the reinforcement learning model may include generating a reward for the reinforcement learning model based upon, at least in part, the monitored access pattern associated with the file and the file delegation determination. Updating the reinforcement learning model may include updating the reinforcement learning model in response to a threshold number of file delegation determinations.

In another example implementation, a computer program product resides on a computer readable medium that has a plurality of instructions stored on it. When executed by a processor, the instructions cause the processor to perform operations that may include but are not limited to receiving a request from a client device to access a file stored in a storage system configured to be communicatively coupled to a plurality of client devices. It may be determined whether to delegate the file to the requesting client device based upon, at least in part, a reinforcement learning model, thus defining a file delegation determination. An access pattern associated with the file may be monitored. The reinforcement learning model may be updated based upon, at least in part, the monitored access pattern associated with the file and the file delegation determination.

One or more of the following example features may be included. Determining whether to delegate the file to the requesting client device may include determining if an access conflict exists for the file in the storage system. The requesting client device may be denied from receiving a delegation of the file in response to determining that the access conflict exists for the file in the storage system. It may be determined whether the client device is eligible for delegation of the file in response to that no access conflict exists for the file in the storage system. Determining whether to delegate the file to the requesting client device may include calculating a delegation possibility value based upon, at least in part, the reinforcement learning model; comparing the delegation possibility value to a predetermined delegation threshold; and delegating the file to the requesting client device if the delegation possibility value is greater than the predetermined delegation threshold. Updating the reinforcement learning model may include generating a reward for the reinforcement learning model based upon, at least in part, the monitored access pattern associated with the file and the file delegation determination. Updating the reinforcement learning model may include updating the reinforcement learning model in response to a threshold number of file delegation determinations.

In another example implementation, a computing system includes at least one processor and at least one memory architecture coupled with the at least one processor, wherein the computing system is configured to perform operations that may include but are not limited to receiving a request from a client device to access a file stored in a storage system configured to be communicatively coupled to a plurality of client devices. It may be determined whether to delegate the file to the requesting client device based upon, at least in part, a reinforcement learning model, thus defining a file delegation determination. An access pattern associated with the file may be monitored. The reinforcement learning model may be updated based upon, at least in part, the monitored access pattern associated with the file and the file delegation determination.

One or more of the following example features may be included. Determining whether to delegate the file to the requesting client device may include determining if an access conflict exists for the file in the storage system. The requesting client device may be denied from receiving a delegation of the file in response to determining that the access conflict exists for the file in the storage system. It may be determined whether the client device is eligible for delegation of the file in response to that no access conflict exists for the file in the storage system. Determining whether to delegate the file to the requesting client device may include calculating a delegation possibility value based upon, at least in part, the reinforcement learning model; comparing the delegation possibility value to a predetermined delegation threshold; and delegating the file to the requesting client device if the delegation possibility value is greater than the predetermined delegation threshold. Updating the reinforcement learning model may include generating a reward for the reinforcement learning model based upon, at least in part, the monitored access pattern associated with the file and the file delegation determination. Updating the reinforcement learning model may include updating the reinforcement learning model in response to a threshold number of file delegation determinations.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

FIGS. 5-7 are example diagrammatic views of an access pattern for a file within a storage system.

Like reference symbols in the various drawings indicate like elements.

DETAILED DESCRIPTION

Figure 1:
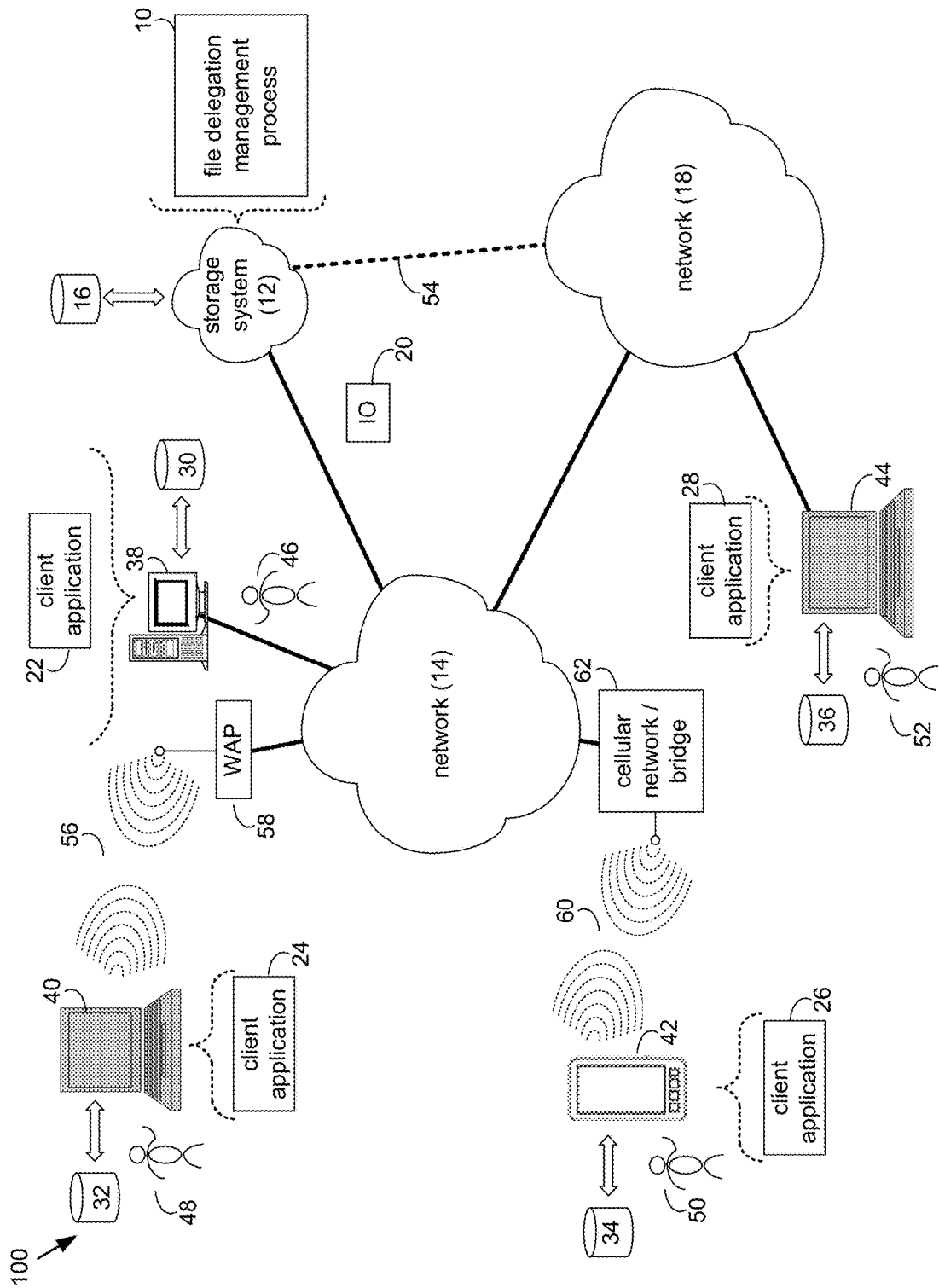
FIG. 1 is an example diagrammatic view of a storage system and a file delegation management process coupled to a distributed computing network according to one or more example implementations of the disclosure.

System Overview:

Referring to FIG. 1, there is shown file delegation management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of file delegation management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of file delegation management process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a process, such as file delegation management process 10 of FIG. 1, may include but is not limited to, receiving a request from a client device to access a file stored in a storage system configured to be communicatively coupled to a plurality of client devices. It may be determined whether to delegate the file to the requesting client device based upon, at least in part, a reinforcement learning model, thus defining a file delegation determination. An access pattern associated with the file may be monitored. The reinforcement learning model may be updated based upon, at least in part, the monitored access pattern associated with the file and the file delegation determination.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
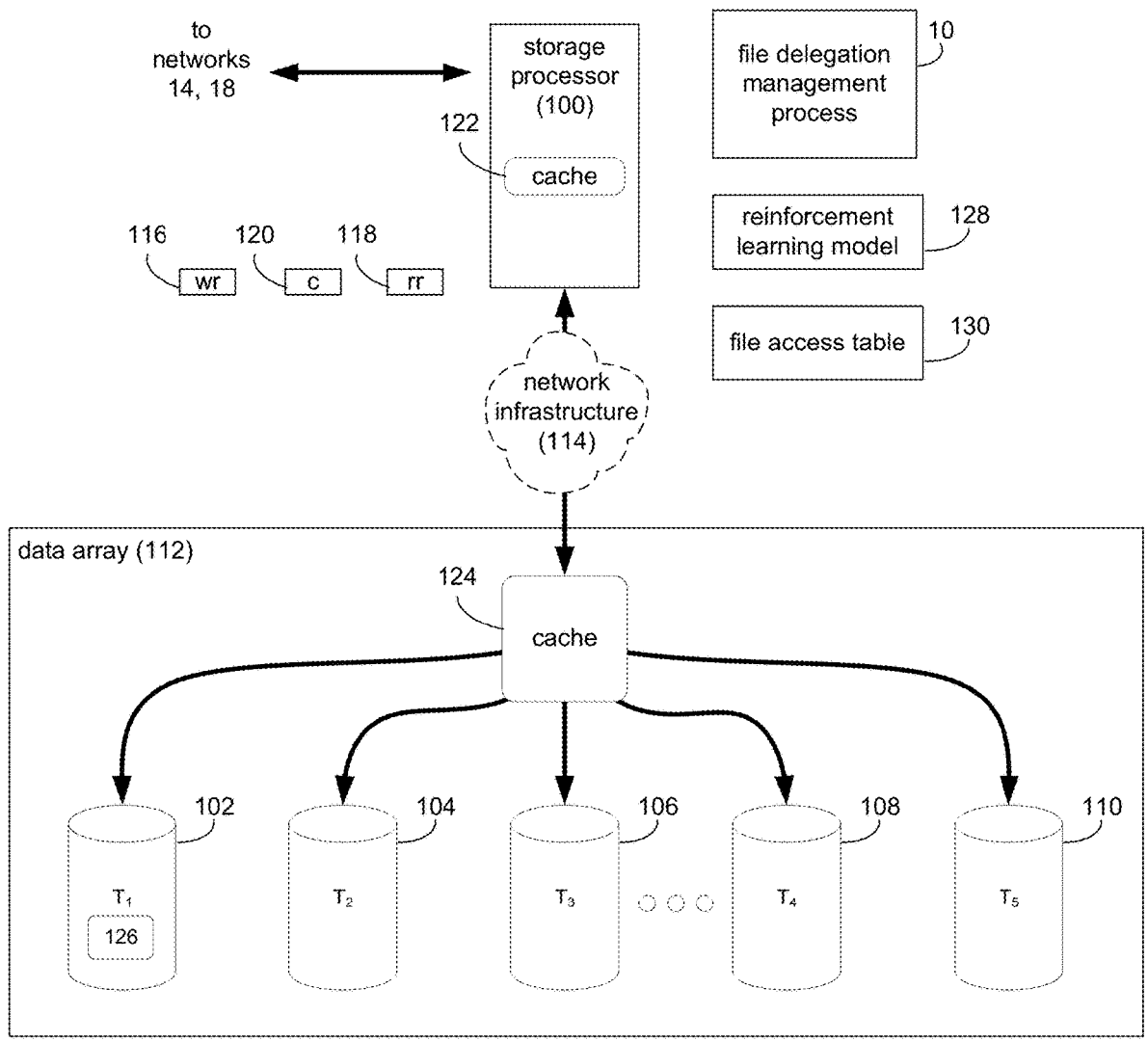
FIG. 2 is an example diagrammatic view of the storage system of FIG. 1 according to one or more example implementations of the disclosure.
Figure 3:
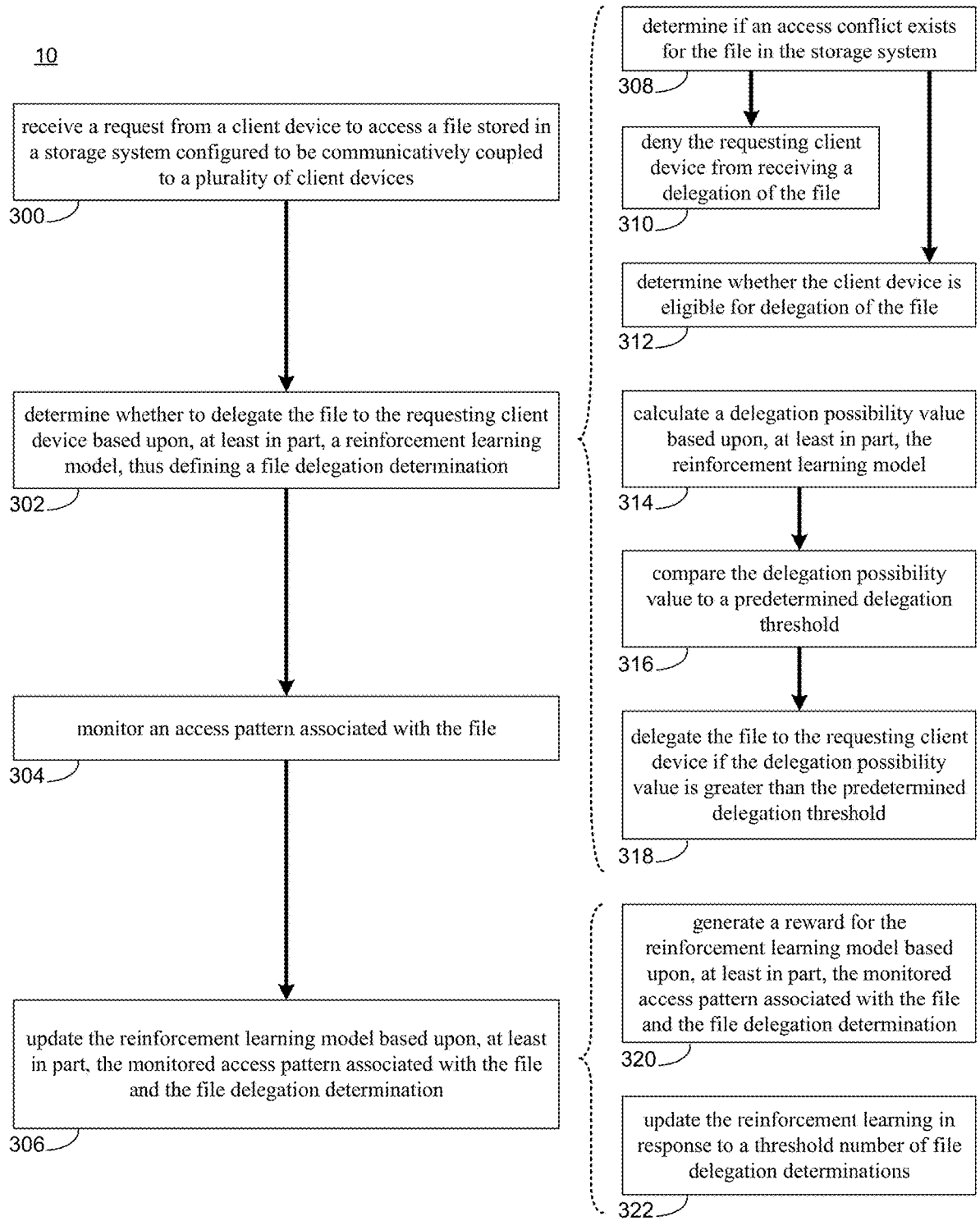
FIG. 3 is an example flowchart of the file delegation management process of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of file delegation management process 10. The instruction sets and subroutines of file delegation management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of file delegation management process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of file delegation management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of file delegation management process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The File Delegation Management Process:

Referring also to FIGS. 3-7 and in some implementations, file delegation management process 10 may receive 300 a request from a client device to access a file stored in a storage system configured to be communicatively coupled to a plurality of client devices. It may be determined 302 whether to delegate the file to the requesting client device based upon, at least in part, a reinforcement learning model, thus defining a file delegation determination. An access pattern associated with the file may be monitored 304. The reinforcement learning model may be updated 306 based upon, at least in part, the monitored access pattern associated with the file and the file delegation determination.

As discussed above, for concurrent file sharing, in order to achieve greater data cache coherence among different clients (e.g., client electronic devices or client devices), performance penalty may be significant. It is difficult to balance between performance and cache coherence without distinguishing sequential or concurrent file sharing among clients. Since NFSv4, file delegation has been introduced to improve cache behavior. Once a file has been delegated to a client, the client can cache the file's data and metadata aggressively, handle opens, closes, and file locks to the file locally without immediate interaction with the server. The effect of delegation is to greatly reduce the interactions between the server and the client for delegated files. Therefore, network traffic is reduced, and performance on the client and on the server is improved. Despite the advantages that the delegation could provide, there are still costs. Once a delegation is granted, there may be overheads at the server side. For example, there may be the issue of delegation conflict. In a delegation conflict, the server must recall the delegation if there is another open/access request. For the client device requesting the delegation, the recall might time out causing the new request not to be served. There may also be issues with file system space. For example, in a delegation response, the server typically provides the limit of the number of modified blocks. However, the server must be careful in its management of available space for new or modified data. Issues with delegation limits may arise. For example, there is generally a limit to the number of write delegations a server can grant to a client. When this amount is reached by the file system, the server must recall all write delegations to flush the outstanding data, which may be time consuming.

As will be discussed in greater detail below and in some implementations of the present disclosure, the file delegation management process may grant a file delegation to clients which are less likely to have conflicts in concurrent file sharing. In this manner, performance and cache coherence balance would be improved and the delegation costs would be reduced in system. Accordingly, implementations of the present disclosure may improve the functioning of a computer (e.g., a storage system) and the technological field of shared storage systems. For example and as will be discussed in greater detail below, implementations of file delegation management process 10 may adopt approaches from the Reinforcement Learning area to alleviate the problems associated with conventional file or data delegation. Reinforcement Learning methods may allow a system to enhance its behavior by self-learning, given a measurement of a series of actions. For example and as will be discussed in greater detail below, the server (e.g., storage processor 100) may serve as an agent and may provide a delegation determination (i.e., grant delegation or not) in response to requests from client devices to access a file or portions of data within a storage system. An access pattern may be maintained as an environment that this agent (e.g., storage processor 100) observes or monitors. In some implementations, a grading system (e.g., a reward) can be roughly organized by how long a client device holds the delegation before it is revoked, whether a delegation is closed normally by a client device, etc. The server (e.g., storage processor 100), based on the reward it receives from each action, may learn to make better decisions as time progress, eventually exceeds the quality of delegations compared to conventional delegation approaches.

In some implementations, file delegation management process 10 may receive 300 a request from a client device to access a file stored in a storage system configured to be communicatively coupled to a plurality of client devices. Referring again to the example of FIGS. 1-3 and in some implementations, a client device (e.g., client device 38) may transmit a request (e.g., IO 20) to a storage system (e.g., storage system 12) configured to be communicatively coupled to a plurality of client devices (e.g., client devices

38, 40, 42, 44). In this example, storage system 12 may receive IO 20 which may include an access or open request (e.g., read request, write request, etc.) for a file (e.g., file 126) stored in data array 112. A file may generally include any portion of data stored in a storage system.

In some implementations, file delegation management process 10 may determine 302 whether to delegate the file to the requesting client device based upon, at least in part, a reinforcement learning model, thus defining a file delegation determination. As discussed above and in some implementations, file delegation may improve cache behavior by allowing a client device to cache the file's data and metadata aggressively, handle opens, closes and file locks to the file locally without immediate interaction with the storage system. Accordingly, network traffic may be reduced and performance on the client device and the storage system may be improved. However, delegation recalls and conflicts may cause storage system processing overhead costs in terms of file system space, and delegation limits. Accordingly, determining 302 whether to grant the file delegation to clients when it is less likely to have conflicts in concurrent file sharing may improve performance and cache coherence balance while reducing delegation costs in the storage system. As will be discussed in greater detail below, a reinforcement learning model may be used to determine 302 whether to delegate a file to a client device.

Reinforcement learning may generally allow a system to enhance its behavior by self-learning given a measurement of a series of actions. For example, a reinforcement learning model may include a neural network or other artificial intelligence model/engine with an "agent" configured to observe an "environment" and receive grades or "rewards" based on decisions made by the system regarding the environment. In some implementations, when a reinforcement learning model makes a decision, the reinforcement learning model may be updated (e.g., via a reward). For correct decisions, the reward may maintain or provide minor changes to the reinforcement learning model. For incorrect decisions, the reward may provide more substantive changes to the reinforcement learning model. For example, if the reinforcement learning model determines that a file delegation should be granted but that file delegation ultimately leads to an access conflict, the reinforcement learning model may receive a reward to correct the weighting of the reinforcement learning model to promote better decisions (i.e., less likely to cause access conflicts).

In some implementations, determining 302 whether to grant a delegation for the file to the requesting client device may include determining 308 if an access conflict exists for the file in the storage system. For example, file delegation management process 10 may determine 408 whether a conflict exists in response to receiving the access request for a file (e.g., file 126) from a client device (e.g., client device 38) based on, at least in part, other requests by the plurality of client devices (e.g., client devices 38, 40, 42, 44) and/or internally within the storage system (e.g., storage processor 100).

In some implementations, file delegation management process 10 may, in response to determining 308 that an access conflict exists for the file in the storage system, deny 310 the requesting client device from receiving a delegation of the file. For example, suppose that another client device (e.g., client device 40) previously provided an access request for the file (e.g., file 126). In this example, file delegation management process 10 may determine 308 that an access conflict exists. In some implementations and in response to determining 308 that an access conflict exists for file 126, file delegation management process 10 may determine whether any file delegations for file 126 already exist. In some implementations, a storage system may maintain a file access table (e.g., file access table 130) to track requests for access to various files, delegations granted and denied to various client devices, types of access requests, etc. In some implementations, the file access table (e.g., file access table 130) may be maintained in storage processor 100 of storage system 12. Returning to the above example where an access conflict is determined 308 for file 126 between client devices 38 and 40, file delegation management process 10 may determine whether file 126 is delegated to another client device (e.g., client device 40). Suppose, for example purposes only, that file delegation management process 10 determines that a file delegation exists for file 126. In this example, file delegation management process 10 may recall the previous delegation of file 126 and may deny 310 client device 40 from receiving a delegation of file 126. Suppose, for example purposes only, that file delegation management process 10 determines that a file delegation does not exist for file 126. In this example, file delegation management process 10 may deny 310 client device 40 from receiving a delegation of file 126.

In some implementations and in response to determining 308 that no access conflict exists for the file, file delegation management process 10 may determine 312 whether the client device is eligible for delegation of the file. For example and referring again to the example of client device 38 requesting access to file 126 stored in storage system 12. Suppose that file delegation management process 10 determines 308 that no access conflict exists for file 126. In this example, file delegation management process 10 may determine 312 whether client device 38 is eligible for delegation of file 126. In some implementations, file delegation management process 10 may maintain a list of client devices and/or users of client devices that are eligible for file delegation. If file delegation management process 10 determines 312 that a client device is not eligible (e.g., ineligible), file delegation management process 10 may not grant a delegation of the file to the client device. Alternatively, if file delegation management process 10 determines 312 that a client device is eligible, file delegation management process 10 may grant a delegation of the file to the client device. In some implementations, client device eligibility may be user-defined, administrator-defined, and/or defined by file delegation management process 10.

In some implementations, determining 302 whether to delegate the file to the requesting client device may include calculating 314 a delegation possibility value based upon, at least in part, the reinforcement learning model. Referring also to the example of FIG. 4 and in some implementations, an input may be provided to the reinforcement learning model (e.g., reinforcement learning model 128). In some implementations, data may be provided as input (e.g., input 400) in the form of a vector as shown in Equation 1:

$$\text{data\_in} = [\text{action, client\_id, requested\_time\_year,} \\ \text{requested\_time\_month, requested\_time\_day,} \\ \text{requested\_time\_hour, requested\_time\_minutes,} \\ \text{delegation\_timedur}] \quad (1)$$

where "action" defines if the request is read, write, or close; "client_id" defines the client ID of the file open requests; "requested_time" is the timestamp in the format of: year, month, day, hour, and minutes (e.g., as five separate features or entries) of the request of the client device; and "delegation_timedur" defines the duration of the last delegation of the client device (e.g., in seconds).

Figure 4:
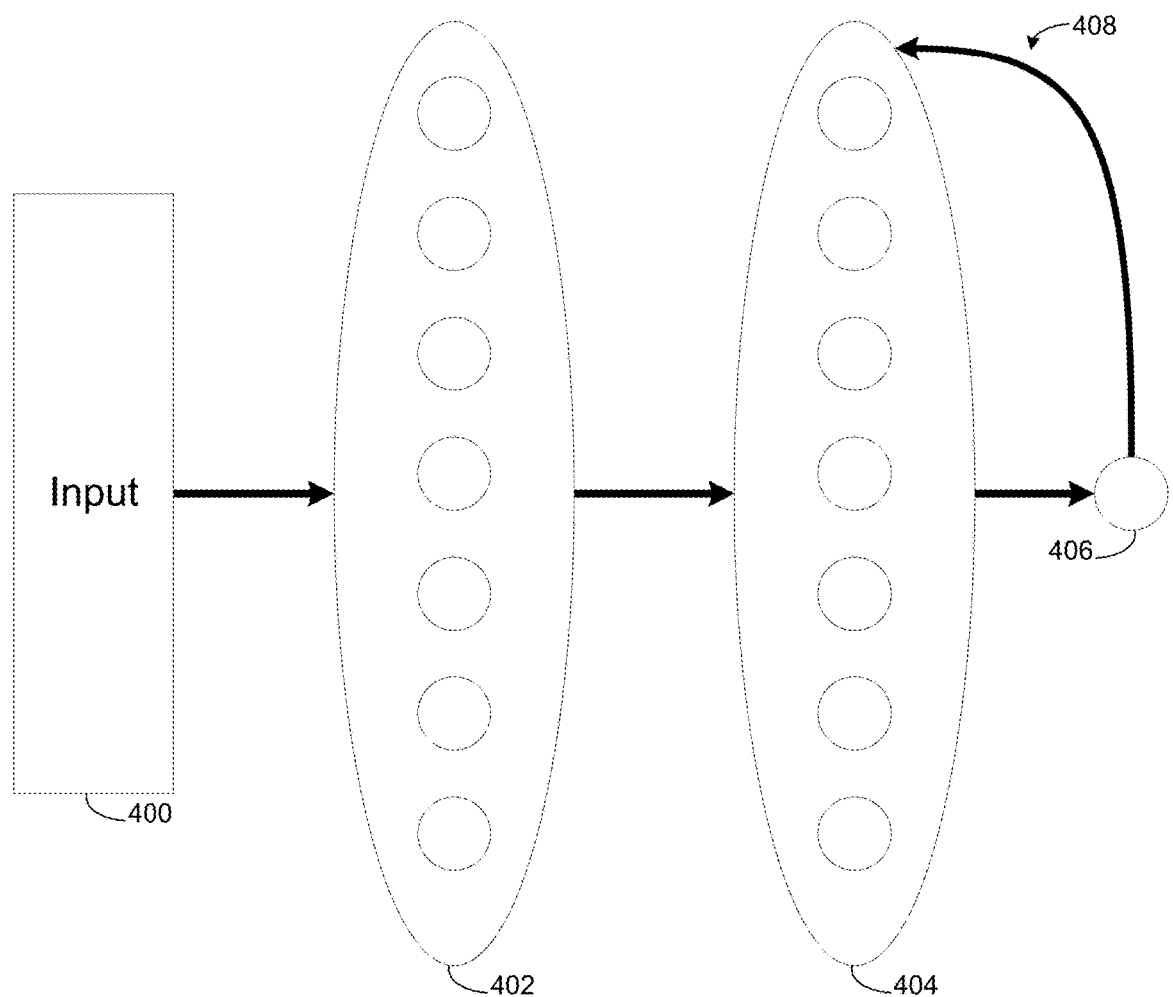
FIG. 4 is an example diagrammatic view of a reinforcement learning model according to one or more example implementations of the disclosure.

While the input has been shown to be a vector, it will be appreciated that the input may be provided in various ways to represent the action, client id, requested time, and delegation duration. It will also be appreciated that other information may be provided in the input. Referring also to the example reinforcement learning model of FIG. 4 and in some implementations, reinforcement learning model 128 may receive an input (e.g., input 400) and may process the input through one or more layers (e.g., layers 402, 404) to generate a result (e.g., result 406). In the example of FIG. 4 and as will be discussed in greater detail below, a reward (represented by arrow 408) may be used to back-propagate the neural network (e.g., reinforcement learning model 128) to update parameters (e.g., W1, b1, W2, and b2) of the layers (e.g., layers 402, 404) which may refine the reinforcement learning model's (e.g., reinforcement learning model 128) behavior. As will be discussed in greater detail below, with each file delegation determination, reinforcement learning model 128 may become more accurate in determining 302 whether or not to grant a delegation for a file to a client device.

In some implementations, the input may be used by reinforcement learning model 128 to evaluate a current environment (e.g., an access pattern associated with the file and/or a plurality of files) and may output a probability between "0" and "1". In some implementations, the output of the reinforcement learning model may generally be referred to as a delegation possibility value.

In some implementations, determining 302 whether to delegate the file to the requesting client device may include comparing 314 the delegation possibility value to a predetermined delegation threshold. In some implementations, the higher the delegation possibility value, the more likely the delegation will be granted.

In some implementations, determining 302 whether to delegate the file to the requesting client device may include delegating 316 the file to the requesting client device if the delegation possibility value is greater than the predetermined delegation threshold. For example, based on the delegation possibility value, file delegation management process 10 may return an action, where "0" means that file delegation management process 10 refuses to grant the delegation, and "1" means that file delegation management process 10 grants the file delegation to the requesting client device. In some implementations, the predetermined delegation threshold may be user-defined and/or defined by file delegation management process 10. In some implementations, the predetermined delegation threshold may be 0.5 which may represent a 50% probability. However, it will be appreciated that any predetermined delegation threshold may be used within the scope of the present disclosure. Accordingly, when the delegation possibility value is greater than the predetermined delegation threshold, file delegation management process 10 may delegate 316 the file to the requesting client device.

Figure 5:
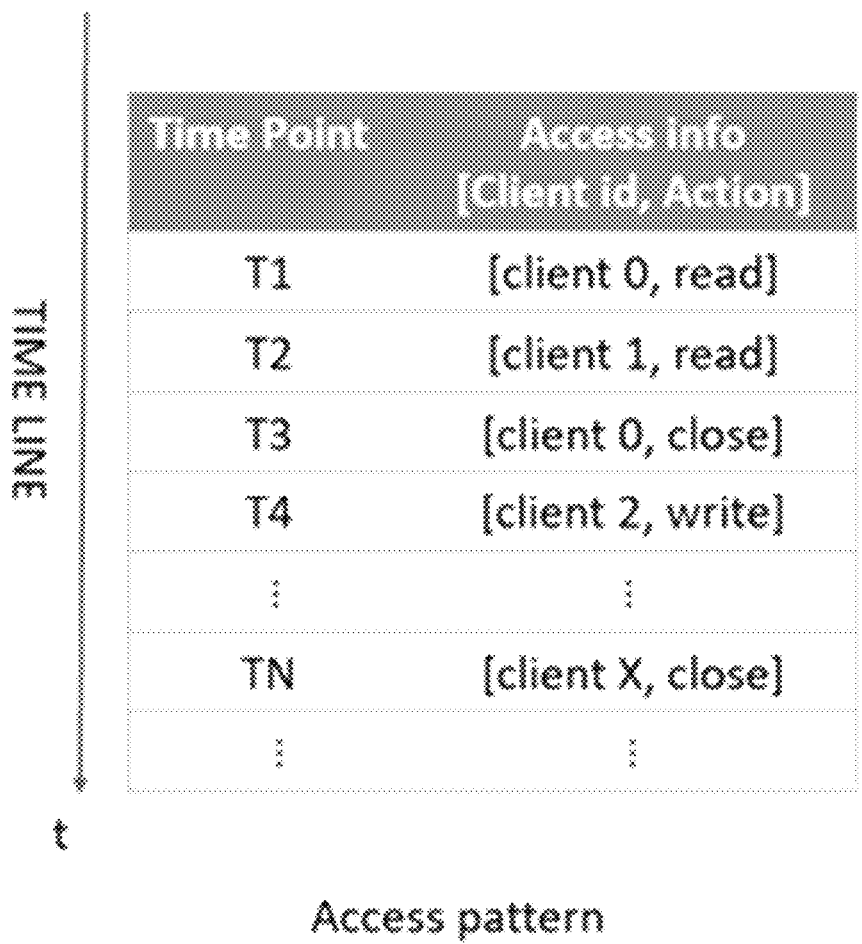

In some implementations, file delegation management process 10 may monitor 304 an access pattern associated with the file. Referring also to the example of FIG. 5 and in some implementations, file delegation management process 10 may monitor 304 the access pattern (e.g., access pattern 500) involving a plurality of client devices for a particular file. In one example, file delegation management process 10 may monitor 304 an access pattern associated with file 126. As shown in FIG. 5, entries may be added to access pattern 500 each time file 126 is accessed by a plurality of client devices. In this example, the access pattern may be monitored for any number of client devices (e.g., "X" client devices).

Figure 6:
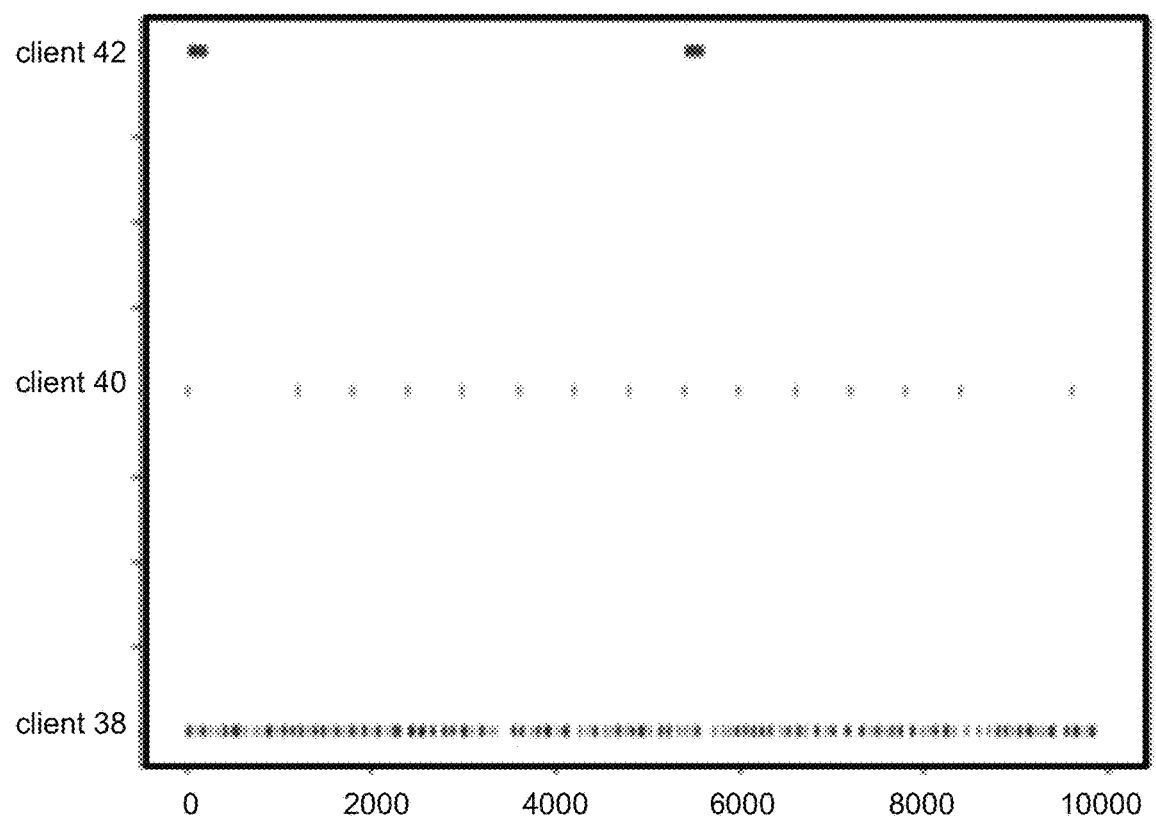

Referring also to the example of FIGS. 6-7 and in some implementations, file delegation management process 10 may receive 300 an access request from a client device (e.g., client device 38) for file 126 at time t=1000 seconds. In this example, file delegation management process 10 may determine 302 not to grant the delegation for file 126. For example, file delegation management process 10 may calculate 314 a delegation possibility value based upon, at least in part, the reinforcement learning model. In this example, the reinforcement learning model may be initialized (e.g., the reinforcement learning model has not been trained or updated). As such, the delegation possibility value may be e.g., 0.5 indicating that the reinforcement learning model has not been trained. In this example, because the delegation possibility value is not greater than the predetermined delegation threshold (e.g., 0.5), file delegation management process 10 may not grant the delegation to client device 38 for file 126. With the decision not to grant the delegation to a client device, file delegation management process 10 may monitor 304 the access pattern associated with file 126.

In some implementations, file delegation management process 10 may monitor 304 an access pattern for a plurality of client devices (e.g., three client devices). In the example of FIG. 6, client device 38 may continuously open write file 126 with a randomized interval. The open duration may conform to a normal distribution. In some implementations, the access pattern for client 38 may simulate an application which permanently stores information into file 126. Continuing with this example, client 40 may open read file 126 periodically (e.g. every hour), the open duration could be very short. In some implementations, the access pattern may simulate a virus scan. An access pattern associated with client device 42 may open read file 126 periodically with long duration (e.g., once per day). In this example, the open duration may be long and may simulate a backup application, which may read the whole of file 126. In some implementations, file delegation management process 10 may maintain the access pattern associated with client devices 38, 40, and 42 in file access table 700.

In some implementations, file delegation management process 10 may update 306 the reinforcement learning model based upon, at least in part, the monitored access pattern associated with the file and the file delegation determination. Referring again to the example of FIGS. 6-7 and in some implementations, file delegation management process 10 may update 306 the reinforcement learning model by generating 320 a reward for the reinforcement learning model based upon, at least in part, the monitored access pattern associated with the file and the file delegation determination. For example, based on the quality of the delegation determination, a reward may be generated 320 for the reinforcement learning model. In the above example of client device 38, at time t=1000, file delegation management process 10 may determine that the delegation determination (e.g., decision not to delegate file 126 to client device 38) was not a quality decision because client device 38 frequently accesses file 126 and because of a low probability of an access conflict between client devices 38, 40, 42. Accordingly, a reward may be generated 320 for the reinforcement learning model.

In some implementations, a reward may be generated 320 to train or update reinforcement learning model. In some implementations, various rewards may be generated 320 for various delegation determinations. For example, a reward of e.g., 10 may be generated for the reinforcement learning model if the file is open without being recalled for at least one hour. In another example, a reward ranging from e.g., −2 to −10 may be generated 320 if the duration of a delegation is less than the average delegation duration. In yet another example, a reward of e.g., −1 may be generated 320 if the duration of the delegation is greater than the average delegation duration. Additionally, file delegation management process 10 may generate 320 a reward ranging from e.g., 2 to 9 if the duration of the delegation is two times over the average delegation duration. While example values for rewards have been discussed, it will be appreciated that any reward values may be used within the scope of the present disclosure to update 306 the reinforcement learning model based upon, at least in part, the monitored access pattern associated with the file and the file delegation determination. It will also be appreciated that the values used for updating 306 the reinforcement learning model may be user-defined and/or defined by file delegation management process 10.

In some implementations, updating 306 the reinforcement learning model may include updating 322 the reinforcement learning model in response to a threshold number of file delegation determinations. For example, file delegation management process 10 may update 322 the reinforcement learning model after a threshold number of file delegation determinations. In some implementations, the threshold number of delegation determinations may be user-defined and/or defined by file delegation management process 10. One example of a threshold number of delegation determinations may be e.g., twenty delegation determinations. However, it will be appreciated that any threshold number of delegation determinations may be used within the scope of the present disclosure. In this manner, the threshold number of delegation determinations may be used to provide a threshold number of delegation determinations before updating the reinforcement learning model.

Referring to the example access pattern shown in FIGS. 6-7 and in some implementations, file delegation management process 10 may continuously provide file delegation determinations and update a reinforcement learning model to more consistently and accurate provide delegation requests to client devices for files that are unlikely to cause an access conflict. In some implementations of the present disclosure, it may be observed that the number of delegation recalls may be reduced significantly. In an implementation of file delegation management process 10 as shown in FIGS. 6-7, it was observed that the total number of delegation recalls for a file involving three client devices was reduced from 1,629 delegation recalls (i.e., without file delegation management process 10) to 692 delegation recalls (i.e., with file delegation management process 10). Accordingly, in this example, a total recall count improvement of 235.4% was observed.

In this manner, implementations of file delegation management process 10 may help storage systems to provide better decisions on delegation requests, find out the rules behind of the file access patterns and rightly reject those that may have conflicts moving forward. Accordingly, the performance of client devices and storage systems may be improved. In some implementations, file delegation management process 10 may not affect other services on the storage system since implementations of file delegation management process 10 may provide an enhancement to decide whether a delegation should be granted to a file access request or not. It will also be appreciated that file delegation management process 10 is user-friendly since it does not need special customer interaction.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    receiving, via the computing device, a request from a client device to access a file stored in a storage system configured to be communicatively coupled to a plurality of client devices;
    determining whether to delegate the file to the requesting client device based upon, at least in part, a reinforcement learning model, thus defining a file delegation determination, wherein the file delegation determination is based upon, at least in part, a probability of receiving additional requests to access to the file from other client devices during the delegation of the file to the requesting client device, wherein delegating the file to the requesting client device includes caching the file at the requesting client device and processing any changes made to the file locally at the requesting client device;
    monitoring an access pattern associated with the file;
    generating a reward for the reinforcement learning model based upon, at least in part, the monitored access pattern associated with the file and the file delegation determination; and
    updating the reinforcement learning model based upon, at least in part, the generated reward and in response to a user-defined threshold number of file delegation determinations.

2. The computer-implemented method of claim 1, wherein determining whether to delegate the file to the requesting client device includes:
    determining if an access conflict exists for the file in the storage system.

3. The computer-implemented method of claim 2, further comprising:
    in response to determining that the access conflict exists for the file in the storage system, denying the requesting client device from receiving a delegation of the file.

4. The computer-implemented method of claim 2, further comprising:
    in response to that no access conflict exists for the file in the storage system, determining whether the client device is eligible for delegation of the file.

5. The computer implemented method of claim 1, wherein determining whether to delegate the file to the requesting client device includes:
    calculating a delegation possibility value based upon, at least in part, the reinforcement learning model;
    comparing the delegation possibility value to a predetermined delegation threshold; and
    delegating the file to the requesting client device if the delegation possibility value is greater than the predetermined delegation threshold.

6. A computer program product residing on a non-transitory computer readable medium having a plurality of instructions stored thereon which, when executed by a processor, cause the processor to perform operations comprising:

receiving a request from a client device to access a file stored in a storage system configured to be communicatively coupled to a plurality of client devices;

determining whether to delegate the file to the requesting client device based upon, at least in part, a reinforcement learning model, thus defining a file delegation determination, wherein the file delegation determination is based upon, at least in part, a probability of receiving additional requests to access to the file from other client devices during the delegation of the file to the requesting client device, wherein delegating the file to the requesting client device includes caching the file at the requesting client device and processing any changes made to the file locally at the requesting client device;

monitoring an access pattern associated with the file;

generating a reward for the reinforcement learning model based upon, at least in part, the monitored access pattern associated with the file and the file delegation determination; and updating the reinforcement learning model based upon, at least in part, the generated reward and in response to a user-defined threshold number of file delegation determinations.

7. The computer program product of claim 6, further comprising instructions for:

determining if an access conflict exists for the file in the storage system.

8. The computer program product of claim 7, further comprising instructions for:

in response to determining that the access conflict exists for the file in the storage system, denying the request from the requesting client device.

9. The computer program product of claim 7, further comprising instructions for:

in response to that no access conflict exists for the file in the storage system, determining whether the client device is eligible for delegation of the file.

10. The computer program product of claim 6, wherein determining whether to delegate the file to the requesting client device includes:

calculating a delegation possibility value based upon, at least in part, the reinforcement learning model;

comparing the delegation possibility value to a predetermined delegation threshold; and delegating the file to the requesting client device if the delegation possibility value is greater than the predetermined delegation threshold.

11. A computing system including a processor and memory configured to perform operations comprising:

receiving a request from a client device to access a file stored in a storage system configured to be communicatively coupled to a plurality of client devices;

determining whether to delegate the file to the requesting client device based upon, at least in part, a reinforcement learning model, thus defining a file delegation determination, wherein the file delegation determination is based upon, at least in part, a probability of receiving additional requests to access to the file from other client devices during the delegation of the file to the requesting client device, wherein delegating the file to the requesting client device includes caching the file at the requesting client device and processing any changes made to the file locally at the requesting client device;

monitoring an access pattern associated with the file;

generating a reward for the reinforcement learning model based upon, at least in part, the monitored access pattern associated with the file and the file delegation determination; and updating the reinforcement learning model based upon, at least in part, the generated reward and in response to a user-defined threshold number of file delegation determinations.

12. The computing system of claim 11, further configured to perform operations comprising:

determining if an access conflict exists for the file in the storage system.

13. The computing system of claim 12, further configured to perform operations comprising:

in response to determining that the access conflict exists for the file in the storage system, denying the request from the requesting client device.

14. The computing system of claim 12, further configured to perform operations comprising:

in response to that no access conflict exists for the file in the storage system, determining whether the client device is eligible for delegation of the file.

15. The computing system of claim 11, wherein determining whether to delegate the file to the requesting client device includes:

calculating a delegation possibility value based upon, at least in part, the reinforcement learning model;

comparing the delegation possibility value to a predetermined delegation threshold; and delegating the file to the requesting client device if the delegation possibility value is greater than the predetermined delegation threshold.

16. The computer-implemented method of claim 1, wherein the access pattern is configured to stimulate a virus scan.

17. The computer-implemented method of claim 1, wherein the access pattern is configured to open a read file with an open duration, wherein the open duration is configured to stimulate a backup application.

* * * * *